United States Patent Office 2,722,642
Patented Nov. 1, 1955

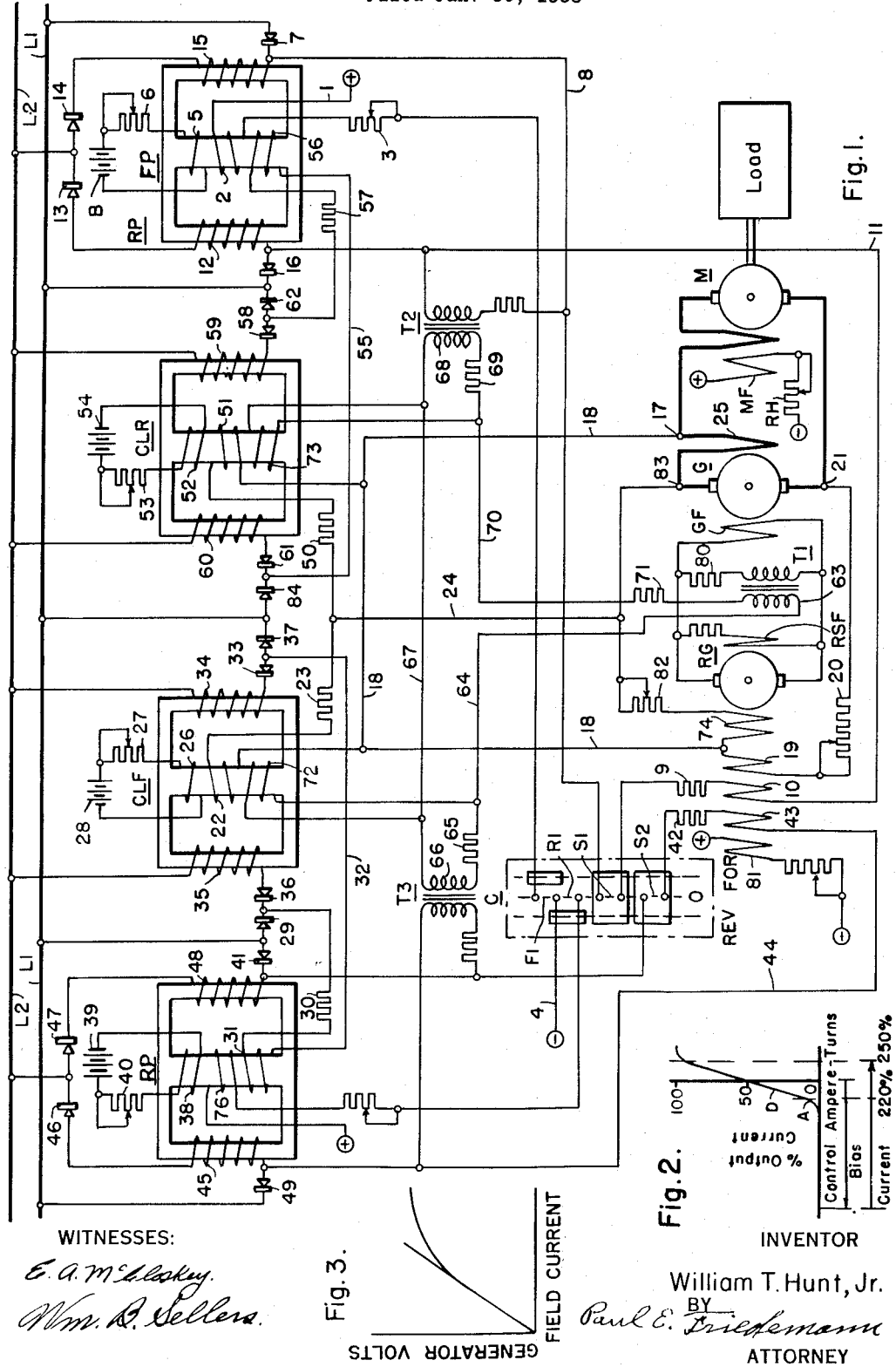

2,722,642

CURRENT LIMIT MOTOR CONTROL SYSTEM

William T. Hunt, Jr., New York, N. Y., assignor to Westinghouse Electric Corporation, East Pittsburgh, Pa., a corporation of Pennsylvania Application January 30, 1953, Serial No. 334,264

15 Claims. (Cl. 318—144)

My invention relates to electric control systems and more particularly to systems of control for direct current motors.

In many fields of application current limit features are desired. One typical example is in the operation of steel mill auxiliaries where current limit control for the load operating motor is rather important.

In the past such current limit control was accomplished by the use of a suitable biasing source interconnected with a current limit field on a voltage regulating generator. The shortcomings of such system of control were the inability of the regulating generator to force the drive into current limit and the current limit characteristic was not steep enough. A change of at least 100% departure of rated armature current was required to change from full voltage to a stall condition.

One broad object of my invention is the provision of effecting a characteristic which changes from full voltage to stall with a relatively small change in motor armature current from the rated armature current.

A more specific object is the provision of a control combination utilizing magnetic amplifiers and a regulating generator for so controlling the voltage of a main generator that the motor armature current, of a motor connected in a loop circuit with the main generator, does not rise appreciably above the rate motor armature current.

A broad object of my invention is the provision of current limit control in a Ward-Leonard drive.

Other objects and advantages will become more apparent from a study of the following specification and the accompanying drawings, in which:

Figure 1 is a diagrammatic showing of my control as applied to a Ward-Leonard drive;

Fig. 2 shows a curve illustrating the operating characteristic of certain elements of my control system; and Fig. 3 depicts the operating characteristics of the regulating generator.

In Fig. 1 the main generator G, in use coupled to be driven at a constant speed by a suitable prime mover, and the motor M, coupled to drive a suitable load as shown, are connected in a loop circuit. The motor is excited at a selected value by the field winding MF connected to a suitable source of direct current through the rheostat RH.

The generator field winding GF is connected in a loop circuit including the armature winding of the regulating generator RG. The regulating generator RG is of the amplifying type, namely the type having the resistance value of its load circuit loop adjusted, or selected, to fall substantially on the no-load saturating curve of the regulating generator RG. This is shown in Fig. 3. Further details may be had by reference to U. S. Patents 2,406,425 and 2,406,426. It will be noted that the load circuit of this regulating generator includes, in addition to the generator field GF, the resistor 80, the shunt field winding RSF and the primary winding of the damping transformer T1. The secondary winding is connected in a circuit to be discussed hereinbelow.

The regulating generator RG has a bias field winding 81 for selecting the point of operation of this generator on the straight portion of its no-load saturation curve. For some applications this bias field winding may not be needed. The regulating generator also has the field winding 19. This field winding 19 is connected from junction 17, through conductor 18, field winding 19, rheostat 20, to junction 21. This field 19 is thus excited as a function of the voltage of the main generator, and is so wound as to be differential to the control field winding 10 when the voltage of the main generator effects forward operation of motor M, and is differential to the control field winding 43 when the voltage of the main generator effects reverse operation of the motor M.

The regulating generator also has a field winding 74 connected across the commutating field winding 25 of the main generator G. The circuit for this field may be traced from junction 17 through conductor 18, field winding 74 and resistor 82 to the junction 83. The function of field winding 74 will become more apparent hereinbelow.

To obtain the improved control effects on the drive I utilize a forward pattern magnetic amplifier FP, a current limit magnetic amplifier CLR for the forward operation of the motor, a reverse pattern magnetic amplifier RP, and a current limit magnetic amplifier CLF for the reverse operation of motor M.

A better understanding of my invention may be had from a study of typical operating sequences.

Operation of the controller C to the forward position, position FOR, causes the closing of switch F1. Switches S1 and S2 are closed in the neutral position and the FOR and REV positions. The closure of switch F1 establishes a circuit from the positive conductor 1 through control coil 2, of the magnetic amplifier FP, the adjustable resistor 3, and switch F1 to the negative conductor 4. A battery or any other suitable source of direct current supply, as B, energizes the biasing winding 5 of magnetic amplifier FP. The circuit for winding 5 includes a suitable adjustable resistor 6, which is so adjusted that the magnetic amplifier FP is biased just above the cut-off point, as point A of Fig. 2. Thus when switch F1 closes the output of magnetic amplifier FP rises to a selected value.

The output circuit for magnetic amplifier FP for one-half cycle may be traced from the alternating current lead L1 through the rectifier 7, conductor 8, switch S1, resistor 9, field winding 10 of the regulating generator RG, conductor 11, the main coil 12 of the magnetic amplifier FP, and rectifier 13 to the alternating current lead L2. For the second half cycle conductor L2 is positive and the circuit may then be traced from lead L2 through rectifier 14, main coil 15 of the magnetic amplifier FP, conductor 8, switch S1, resistor 9, field 10, conductor 11, rectifier 16 to the alternating current conductor L1.

It will be noted that the excitation of field winding 10 is in the same direction for both half cycles. The output of magnetic amplifier FP thus produces an excitation in field winding 10 that serves as a pattern for the forward direction of operation of the motor M. This means that there is during this starting operation, when the main generator voltage is substantially zero, a considerable unbalance between the excitation of field winding 10 and the field winding 19. This unbalance will cause the voltage of the regulating generator to rise to thus increase the excitation of the main generator. The voltage of the main generator thus also rises to accelerate the motor and its load in the forward direction.

If the load on the motor is large and the $WR^2$ or moment of inertia is large, the motor armature current required to accelerate the motor at the rate the main generator voltage is increasing may be excessive. The magnetic amplifier CLF is biased to be very near the point of cut-off, for example point A on the curve D shown in Fig. 2. This magnetic amplifier CLF has the control winding 22 connected across the commutating field winding 25. The circuit for this control winding 22 may be traced from junction 17, through conductor 18, control winding 22, resistor 23, and conductor 24 to junction 83.

This motor armature current responsive control winding 22 is so designed and the resistance value of resistor 23 is so adjusted that 220% of rated motor armature current will produce enough ampere-turns to balance a portion of the ampere-turns of the bias winding 26 to cause the magnetic amplifier CLF to operate at point A on curve D. The bias winding 26 is connected to the direct current supply 28 through the adjustable resistor 27. An increase of motor armature current above 220% causes an increase in the output of magnetic amplifier CLF. For decelerating currents and accelerating currents belows 220%, the output of magnetic amplifier CLF is nearly zero but for any accelerating currents above 220% the output increases rapidly.

For the assumed forward operation at 250% rated motor armature current the output of magnetic amplifier CLR reaches the point where it excites the magnetic amplifier FP. The magnetic amplifier RP, for an output of the magnetic amplifier CLF corresponding to 250% rated motor armature current, also operates at a point on its characteristic corresponding to point A of Fig. 2. The bias winding 38 is connected to the direct current supply 39 through the adjustable resistor 40 whereby the bias adjustment may be made to cause operation at point A. This means that as soon as the control winding 31 is energized by the increased output of magnetic amplifier CLF, the output of magnetic amplifier RP also rises rather rapidly.

Control winding 31 of the magnetic amplifier RP is connected in the output circuit of magnetic amplifier CLF. For the first half cycle the circuit may be traced from the alternating current lead L1 through rectifier 29, resistor 30, control winding 31, conductor 32, rectifier 33, main winding 34 to the lead L2. For the second half cycle, when lead L2 is positive, the circuit may be traced from lead L2 through the main winding 35, rectifier 36, resistor 30, control winding 31, conductor 32 and rectifier 37 to the lead L1.

For the first half cycle the output circuit for magnetic amplifier RP may be traced from lead L1 through rectifier 41, switch S2, resistor 42, reverse field winding 43, conductor 44, main winding 45 and rectifier 46 to lead L2 and for the second half cycle, when lead L2 is positive, may be traced from lead L2 through rectifier 47, main winding 48, switch S2, resistor 42, reverse field winding 43, conductor 44, rectifier 49 to lead L1.

The excitation of field winding 43 produces enough ampere turns to almost balance the forward pattern field winding 10. The accelerating current can thus not rise above 250% of rated motor armature current even though the motor be stalled.

Since the excitation of field winding 43 does not completely balance out the excitation of field winding 10 just enough excitation is supplied to maintain some voltage output from the regulating generator RG. As the motor M accelerates, that is, as the main generator voltage rises, the excitation of field winding 19 increases and the ampere-turns, that is, excitation effect, of field winding 43 is reduced by a decrease in the motor armature current below 250% of rated full-load motor armature current. As the maximum voltage of the generator is approached, the motor armature current will have fallen below 220% thus producing minimum output from amplifier CLF and thus of amplifier RP. Thereafter the drive runs as a voltage regulated drive and the motor armature current is determined by the motor load requirements.

Deceleration is accomplished by movement of the controller C to the off position (0) to open switch F1. The excitation of field 10 is thus reduced to a minimum or to zero, and since the differential field winding 19 is at the moment fully energized the excitation of this field winding 19 forces the regulating generator RG to drive the voltage of the main generator toward zero. This results in deceleration of the motor armature. Since the opposing motor voltage is in excess of the main generator voltage, the polarity across the commutating field winding 25 is reversed. An energizing circuit for the control winding 51 of magnetic amplifier CLR is now established from the junction 83 through conductor 24, resistor 50, control winding 51 and conductor 18 to junction 17.

Magnetic amplifier CLR is normally biased to a point A on its characteristic. The bias winding 52 for magnetic amplifier CLR is connected to the direct current supply 54 through the adjustable resistor 53, whereby this magnetic amplifier may have its bias so adjusted that it normally operates at point A.

When the control winding 51 is being energized to oppose the bias of winding 52, the output of magnetic amplifier CLR rises rapidly. This output is supplied to the control winding 56 of the magnetic amplifier FP. The output circuits of magnetic amplifier CLR may be traced for the first half cycle from L1 through rectifier 84, conductor 55, control winding 56, resistor 57, rectifier 58, main winding 59 to lead L2, and for the second half cycle from lead L2 through main winding 60, rectifier 61, conductor 55, control winding 56, resistor 57, rectifier 62 to lead L1. The output of magnetic amplifier FP now energizes the field winding 10. That is, for deceleration magnetic amplifiers CLR and FP function cooperatively exactly as the cooperative function hereinbefore described for magnetic amplifiers CLF and RP. The output from CLR and FP produce ampere turns in field winding 10 which oppose the ampere turns of field winding 19. The resultant ampere turns are the net amount to permit the drive to decelerate with the motor armature current limited between the values of 250% and 220% of the rated full-load motor armature current.

For reverse operation the controller C is moved to reverse position REV to close switch R1. Closure of R1 establishes a circuit for control coil 76 of magnetic amplifier RP. From the ample discussions above it will be apparent that magnetic amplifiers CLR and FP serve to limit the current during reverse acceleration and magnetic amplifiers CLF and RP serve to limit the current during deceleration of reverse operation.

As the gain in the current limit feedback circuits is very high, damping feedbacks are obtained through the damping transformers T1, T2 and T3. The primary winding of transformer T1 is connected to the regulator generator armature to be responsive to the rate of change and regulator generator voltage, the primary of transformer T2 is connected to be responsive to rate of change in the output of amplifier FP and the primary of transformer T3 is responsive to rate of change in the output of amplifier RP. The secondary windings of these transformers are connected in a single loop circuit, comprising secondary 63, conductor 64, resistor 65, secondary 66, conductor 67, secondary 68, resistor 69, conductor 70, and resistor 71 back to the secondary 63.

The feedback winding 72 of the current limit magnetic amplifier CLF is connected across conductors 64 and 67 and the feedback winding 73 of the current limit magnetic amplifier CLR is connected across conductors 70 and 67. When these amplifiers are operating below cut-off, the signal from the damping transformers is unable to produce any change in the outputs of these amplifiers. When one amplifier is producing an output because the motor armature current is within the current limit region, the signals from the damping transformers can then produce an effect in that amplifier. The damping transformers are thus effective when current limit is operating, but are ineffective when the voltage regulation alone is in operation. This proves quite effective in eliminating the tendency toward oscillation when current limit is in operation. This better stability also results in lower peak currents when the motor armature current rises into the current limit region.

The contacts S1 and S2 do not play a part in the control operation but provide, when the controller is moved to its limit positions (not shown), for open circuiting the field windings 10 and 43 when the drive is at standstill. This results in good "suiciding" of the drive through the action of field windings 19. The droop field winding 74 is shown as a means for adjusting the regulation of the drive if the inherent droop of the motor is not satisfactory.

The many advantages of my contribution to the art include a good current limit characteristic with good stability, ease of adjustment of the current limit characteristic, and the elimination of equipment necessary in prior art devices.

While I have shown but a single embodiment of my invention it is understood that my invention is capable of changes and modifications all falling within the spirit of the invention.

I claim as my invention:

1. In a system of control for a Ward-Leonard drive including a main generator driven at suitable, preferably constant, speed and having its armature winding connected in a loop circuit with the armature winding of a motor coupled to drive a load, in combination, a motor field winding, means for effecting the excitation of the motor field winding in any selected manner, a field winding for the main generator, a regulating generator having its armature winding connected in a loop circuit with the generator field winding, field winding means for the regulating generator, energizing circuit means, including energized terminals and switching means, for effecting the energization of the regulating generator field winding means at a selected value to thus cause the regulating generator voltage to rise, a first self-saturating magnetic amplifier having main windings and control windings and being biased into its minimum output range, a second self-saturating magnetic amplifier having main windings connected to energize the regulating generator field winding means in a sense opposite to said energizing circuit means and having control windings connected to be responsive to the output of the main windings of the first self-saturating magnetic amplifier and being biased substantially to its minimum output range, said control windings of the first self-saturating magnetic amplifier being connected to be responsive to the load current of the motor.

2. In a system of control for a Ward-Leonard drive including a main generator driven at a suitable, preferably constant, speed and having its armature winding connected in a loop circuit with the armature winding of a motor coupled to drive a load, in combination, a motor field winding, means for effecting the excitation of the motor field winding in any selected manner, a field winding for the main generator, a damping transformer having its primary winding connected in parallel with the main generator field winding, a regulating generator having its armature winding connected in a loop circuit with the main generator field winding and the parallelly connected primary winding of the damping transformer, a pattern field winding for the regulating generator, circuit means, including energized terminals and switching means, for effecting the energization of the pattern field winding at a selected value to thus cause the regulating generator voltage to rise, a current limit field winding for the regulating generator, a first self-saturating magnetic amplifier having main windings and control windings, a second self-saturating magnetic amplifier having main windings connected to the current limit field winding of the regulating generator and having control windings connected to be responsive to the output of the main windings of the first self-saturating magnetic amplifier, said control windings of the first self-saturating magnetic amplifier being connected to be responsive to the load current of the motor, the secondary winding of said damping transformer being connected to dampen the output of said first self-saturating magnetic amplifier.

3. In a system of control for a Ward-Leonard drive including a main generator driven at suitable, preferably constant, speed and having its armature winding connected in a loop circuit with the armature winding of a motor coupled to drive a load, in combination, a motor field winding, means for effecting the excitation of the motor field winding in any selected manner, a field winding for the main generator, a regulating generator having its armature winding connected in a loop circuit with the main generator field winding, field windings means for the regulating generator, energizing circuit means, including energized terminals and switching means, for effecting the energization of the regulating generator field winding means at a selected value to thus cause the regulating generator voltage to rise, circuit means connecting said regulating generator field winding means to be responsive to the voltage of the main generator to thus through the regulating generator regulate the voltage of the generator, a first self-saturating magnetic amplifier having main windings and control windings and being biased into its minimum output range, a second self-saturating magnetic amplifier having main windings connected to energize the regulating generator field winding means in a sense opposite to said energizing circuit means and having control windings connected to be responsive to the output of the main windings of the first self-saturating magnetic amplifier and being biased substantially to its minimum output range, said control windings of the first self-saturating magnetic amplifier being connected to be responsive to the load current of the motor.

4. In a system of control for a Ward-Leonard drive including a main generator driven at a suitable, preferably constant, speed and having its armature winding connected in a loop circuit with the armature winding of a motor coupled to drive a load, in combination, a motor field winding, means for effecting the excitation of the motor field winding in any selected manner, a field winding for the main generator, a damping transformer having its primary winding connected in parallel with the main generator field winding, a regulating generator having its armature winding connected in a loop circuit with the main generator field winding and the parallelly connected primary winding of the damping transformer, a pattern field winding for the regulating generator, circuit means, including energized terminals and switching means, for effecting the energization of the pattern field winding at a selected value to thus cause the regulating generator voltage to rise, a voltage regulating field winding for the regulating generator, said voltage regulating field winding being connected to be responsive to the voltage of the main generator to thus through the regulating generator regulate the voltage of the main generator, a current limit field winding for the regulating generator, a first self-saturating magnetic amplifier having main windings and control windings, a second self-saturating magnetic amplifier having main windings connected to the current limit field winding of the regulating generator and having control windings connected to be responsive to the output of the main windings of the first self-saturating magnetic amplifier, said control windings of the first self-saturating magnetic amplifier being connected to be responsive to the load current of the motor, the secondary winding of said damping transformer being connected to dampen the output of said first self-saturating magnetic amplifier.

5. In a system of control for a Ward-Leonard drive including a main generator driven at a suitable, preferably constant, speed and having its armature winding connected in a loop circuit with the armature winding of the motor comprising the motor element of the Ward-Leonard drive, in combination, a field winding for the motor connected to suitably energized terminals to thus be excited in any selected manner, a field winding for the main generator, a regulating generator having its armature winding connected in a control loop circuit with the field winding of the main generator, said control loop circuit having its resistance selected to fall substantially on the straight portion of the no-load saturation curve of the regulating generator, said regulating generator having a pattern field winding connected to energized terminals to be excited in a given sense and at a given magnitude to thus effect acceleration of the motor in a given direction, a current limit field winding for the regulating generator, a first self-saturating magnetic amplifier having main windings, connected to energize said current limit field winding, and having bias windings and control windings, said first self-saturating magnetic amplifier being biased near cut-off and the winding sense of the control winding being such that a selected rise in the control current causes a rapid rise in the output of the main windings whereby the current limit field winding is rapidly excited to decrease the output of the regulating generator, and a second magnetic amplifier responsive to the motor load current for controlling the excitation of the control winding of the self-saturating magnetic amplifier.

6. In a system of control for a Ward-Leonard drive including a main generator driven at a suitable, preferably constant, speed and having its armature winding connected in a loop circuit with the armature winding of the motor comprising the motor element of the Ward-Leonard drive, in combination, a field winding for the motor connected to suitably energized terminals to thus be excited in any selected manner, a field winding for the main generator, a regulating generator having its armature winding connected in a control loop circuit with the field winding of the main generator, said control loop circuit having its resistance selected to fall substantially on the straight portion of the no-load saturation curve of the regulating generator, said regulating generator having a pattern field winding connected to energized terminals to be excited in a given sense and at a given magnitude to thus effect acceleration of the motor in a given direction, a current limit field winding for the regulating generator, a first self-saturating magnetic amplifier having main windings, connected to energize said current limit field winding, and having bias windings and control windings, said first self-saturating magnetic amplifier being biased near cut-off and the winding sense of the control winding being such that a selected rise in the control current causes a rapid rise in the output of the main windings whereby the current limit field winding is rapidly excited to decrease the output of the regulating generator, a second self-saturating magnetic amplifier having main windings, a control winding, and a bias winding, said main windings of the second self-saturating magnetic amplifier being connected to energize the control windings of the first self-saturating magnetic amplifier, the control winding being connected to be responsive to the motor load current, and the bias winding being energized so that the second self-saturating magnetic amplifier operates near cut-off, the winding sense of the control winding being such as to increase the output current of the second self-saturating magnetic amplifier with a rise in motor load current.

7. In a system of control for a Ward-Leonard drive including a main generator driven at a suitable, preferably constant, speed and having its armature winding connected in a loop circuit with the armature winding of the motor comprising the motor element of the Ward-Leonard drive, in combination, a field winding for the motor connected to suitably energized terminals to thus be excited in any selected manner, a field winding for the main generator, a regulating generator having its armature wind-ing connected in a control loop circuit with the field winding of the main generator, said control loop circuit having its resistance selected to fall substantially on the straight portion of the no-load saturation curve of the regulating generator, said regulating generator having a pattern field winding connected to energized terminals to be excited in a given sense and at a given magnitude to thus effect acceleration of the motor in a given direction, a current limit field winding for the regulating generator, a first self-saturating magnetic amplifier having main windings, connected to energize said current limit field winding, and having bias windings and control windings, said first self-saturating magnetic amplifier being biased near cut-off and the winding sense of the control winding being such that a selected rise in the control current causes a rapid rise in the output of the main windings whereby the current limit field winding is rapidly excited to decrease the output of the regulating generator, a second self-saturating magnetic amplifier having main windings, a control winding, and a bias winding, said main windings of the second self-saturating magnetic amplifier being connected to energize the control windings of the first self-saturating magnetic amplifier, the control winding being connected to be responsive to the motor load current, and the bias winding being energized so that the second self-saturating magnetic amplifier operates near cut-off, the winding sense of the control winding being such as to increase the output current of the second self-saturating magnetic amplifier with a rise in motor load current, and a damping transformer responsive to voltage surges of the main generator for damping the output of the first self-saturating magnetic amplifier when operating above the cut-off point.

8. In a system of control for a Ward-Leonard drive, in combination, a main generator having an armature winding and a field winding, the excitation of which is to be controlled, a motor having an armature winding connected in a loop circuit with the armature winding of the main generator and having a field winding, in use, connected to suitably energized terminals to thus be excited in any selected manner, a regulating generator having an armature winding connected in a loop circuit with the generator field winding, this said second named loop circuit having a resistance value so selected that it falls substantially on the straight portion of the no-load saturation curve of the regulating generator, said regulating generator having a pattern field winding, a second pattern field winding, a self-saturating magnetic amplifier, a controller having a neutral position and an operating position, said magnetic amplifier having suitably energized main windings connected to energize the pattern field winding of the regulating generator, having a bias winding biasing the magnetic amplifier to near cut-off, and having a control winding acting differentially to the bias winding, means responsive to the operation of the controller to the operating position for effecting the energization of the control winding whereby the main generator becomes excited, said regulating generator having a second field winding wound to act in opposition to the first pattern field winding, a second self-saturating magnetic amplifier having suitably energized main windings connected to energize the second field winding of the regulating generator, said second magnetic amplifier having a bias winding for biasing the second magnetic amplifier near cut-off and having a control winding wound to act in opposition to the bias winding, a third self-saturating magnetic amplifier having suitably energized main windings connected to supply their output to the control winding of the second magnetic amplifier, said third magnetic amplifier having a bias winding for biasing the third magnetic amplifier to near cut-off, and having a control winding, acting in opposition to the bias winding, connected to be responsive to the motor load current.

9. In a system of control for a Ward-Leonard drive, in combination, a main generator having an armature winding and a field winding, the excitation of which is to be controlled, a motor having an armature winding connected in a loop circuit with the armature winding of the main generator and having a field winding, in use, connected to suitably energized terminals to thus be excited in any selected manner, a regulating generator having an armature winding connected in a loop circuit with the generator field winding, this said second named loop circuit having a resistance value so selected that it falls substantially on the straight portion of the no-load saturation curve of the regulating generator, said regulating generator having a voltage-regulating field winding connected to the main generator to be responsive to the voltage of the main generator, a pattern field winding, a second pattern field winding, a self-saturating magnetic amplifier, a controller having a neutral position and an operating position, said magnetic amplifier having suitably energized main windings connected to energize the pattern field winding of the regulating generator, having a bias winding biasing the magnetic amplifier to near cut-off, and having a control winding acting differentially to the bias winding, means responsive to the operation of the controller to the operating position for effecting the energization of the control winding whereby the main generator becomes excited, said regulating generator having a second field winding wound to act in opposition to the first pattern field winding, a second self-saturating magnetic amplifier having suitably energized main windings connected to energize the second field winding of the regulating generator, said second magnetic amplifier having a bias winding for biasing the second magnetic amplifier near cut-off and having a control winding wound to act in opposition to the bias winding, a third self-saturating magnetic amplifier having suitably energized main windings connected to supply their output to the control winding of the second magnetic amplifier, said third magnetic amplifier having a bias winding for biasing the third magnetic amplifier to near cut-off, and having a control winding, acting in opposition to the bias winding, connected to be responsive to the motor load current.

10. In a system of control for a Ward-Leonard drive, in combination, a main generator having an armature winding and a field winding, the excitation of which is to be controlled, a motor having an armature winding connected in a loop circuit with the armature winding of the main generator and having a field winding, in use, connected to suitably energized terminals to thus be excited in any selected manner, a regulating generator having an armature winding connected in a loop circuit with the generator field winding, this said second named loop circuit having a resistance value so selected that it falls substantially on the straight portion of the no-load saturation curve of the regulating generator, said regulating generator having a forward pattern field winding, a reverse pattern field winding, a forward pattern self-saturating magnetic amplifier, a controller having a neutral position, a forward operating position, and a reverse operating position, said magnetic amplifier having suitably energized main windings connected to energize the forward pattern field winding of the regulating generator, having a bias winding biasing the magnetic amplifier to near cut-off, and having a control winding acting differentially to the bias winding, means responsive to the operation of the controller to the forward operating position for effecting the energization of the control winding whereby the main generator becomes excited, said reverse pattern field winding of said regulating generator being wound to act in opposition to said forward pattern field winding, a second or reverse pattern self-saturating magnetic amplifier having suitably energized main windings connected to energize the reverse pattern field winding of the regulating generator, said second magnetic amplifier having a bias winding for biasing the second magnetic amplifier near cut-off and having a control winding wound to act in opposition to the bias winding, a third self-saturating magnetic amplifier having suitably energized main windings connected to supply their output to the control winding of the second magnetic amplifier, said third magnetic amplifier having a bias winding for biasing the third magnetic amplifier to near cut-off, and having a control winding, acting in opposition to the bias winding, connected to be responsive to the motor load current, and having a second control winding also acting in opposition to the control windings, means responsive to the operation of the controller to the reverse operating position for effecting the energization of the second control winding.

11. In a system of control for a Ward-Leonard drive, in combination, a main generator having an armature winding and a field winding, the excitation of which is to be controlled, a motor having an armature winding connected in a loop circuit with the armature winding of the main generator and having a field winding, in use, connected to suitably energized terminals to thus be excited in any selected manner, a regulating generator having an armature winding connected in a loop circuit with the generator field winding, this said second named loop circuit having a resistance value so selected that it falls substantially on the straight portion of the no-load saturation curve of the regulating generator, said regulating generator having a pattern field winding, a second pattern field winding, a self-saturating magnetic amplifier, a controller having a neutral position and an operating position, said magnetic amplifier having suitably energized main windings connected to engerize the pattern field winding of the regulating generator, having a bias winding biasing the magnetic amplifier to near cut-off, and having a control winding acting differentially to the bias winding, means responsive to the operation of the controller to the operating position for effecting the energization of the control winding whereby the main generator becomes excited, said regulating generator having a second field winding wound to act in opposition to the first pattern field winding, a second self-saturating magnetic amplifier having suitably energized main windings connected to energize the second field winding of the regulating generator, said second magnetic amplifier having a bias winding for biasing the second magnetic amplifier near cut-off and having a control winding wound to act in opposition to the bias winding, a third self-saturating magnetic amplifier having suitably energized main windings connected to supply their output to the control winding of the second magnetic amplifier, said third magnetic amplifier having a bias winding for biasing the third magnetic amplifier to near cut-off, and having a control winding, acting in opposition to the bias winding, connected to be responsive to the motor load current, and damping transformer means responsive to changes in electrical operating characteristics of the first and third magnetic amplifiers and the generator field winding for damping out excessive output voltage changes of the regulating generator.

12. In a system of control for a Ward-Leonard drive, in combination, a main generator having an armature winding and a field winding, the excitation of which is to be controlled, a motor having an armature winding connected in a loop circuit with the armature winding of the main generator and having a field winding, in use, connected to suitably energized terminals to thus be excited in any selected manner, a regulating generator having an armature winding connected in a loop circuit with the generator field winding, this said second named loop circuit having a resistance value so selected that it falls substantially on the straight portion of the no-load saturation curve of the regulating generator, said regulating generator having a voltage-regulating field winding connected to the main generator to be responsive to the voltage of the main generator, a forward pattern field winding, a reverse pattern field winding, a forward pattern self-saturating magnetic amplifier, a controller having a neutral position, a forward operating position, and a reverse operating position, said magnetic amplifier having suitably energized main windings connected to energize the forward pattern field winding of the regulating generator, having a bias winding biasing the magnetic amplifier to near cut-off, and having a control winding acting differentially to the bias winding, means responsive to the operation of the controller to the forward operating position for effecting the energization of the control winding whereby the main generator becomes excited, said regulating generator having a reverse pattern field winding wound to act in opposition to the first or forward pattern field winding, a second or reverse pattern self-saturating magnetic amplifier having suitably energized main windings connected to energize the reverse pattern field winding of the regulating generator, said second magnetic amplifier having a bias winding for biasing the second magnetic amplifier near cut-off and having a control winding wound to act in opposition to the bias winding, a third self-saturating magnetic amplifier having suitably energized main windings connected to supply their output to the control winding of the second magnetic amplifier, said third magnetic amplifier having a bias winding for biasing the third magnetic amplifier to near cut-off, and having a control winding, acting in opposition to the bias winding, connected to be responsive to the motor load current, and having a second control winding also acting in opposition to the control windings, means responsive to the operation of the controller to the reverse operating position for effecting the energization of the second control winding.

13. In a system of control for a Ward-Leonard drive, in combination, a main generator having an armature winding and a field winding, the excitation of which is to be controlled, a motor having an armature winding connected in a loop circuit with the armature winding of the main generator and having a field winding, in use, connected to suitably energized terminals to thus be excited in any selected manner, a regulating generator having an armature winding connected in a loop circuit with the generator field winding, this said second named loop circuit having a resistance value so selected that it falls substantially on the straight portion of the no-load saturation curve of the regulating generator, said regulating generator having a voltage-regulating field winding connected to the main generator to be responsive to the voltage of the main generator, a pattern field winding, a second pattern field winding, a self-saturating magnetic amplifier, a controller having a neutral position and an operating position, said magnetic amplifier having suitably energized main windings connected to energize the pattern field winding of the regulating generator, having a bias winding biasing the magnetic amplifier to near cut-off, and having a control winding acting differentially to the bias winding, means responsive to the operation of the controller to the operating position for effecting the energization of the control winding whereby the main generator becomes excited, said regulating generator having a second field winding wound to act in opposition to the first pattern field winding, a second self-saturating magnetic amplifier having suitably energized main windings connected to energize the second pattern field winding of the regulating generator, said second magnetic amplifier having a bias winding for biasing the second magnetic amplifier near cut-off and having a control winding wound to act in opposition to the bias winding, a third self-saturating magnetic amplifier having suitably energized main windings connected to supply their output to the control winding of the second magnetic amplifier, said third magnetic amplifier having a bias winding for biasing the third magnetic amplfier to near cut-off, and having a control winding, acting in opposition to the bias winding, connected to be responsive to the motor load current, and damping transformer means responsive to changes in electrical operating characteristics of the first and third magnetic amplifiers and the generator field winding for damping out excessive output voltage changes of the regulating generator.

14. In a system of control for a Ward-Leonard drive, in combination, a main generator having an armature winding and a field winding, the excitation of which is to be controlled, a motor having an armature winding connected in a loop circuit with the armature winding of the main generator and having a field winding, in use, connected to suitably energized terminals to thus be excited in any selected manner, a regulating generator having an armature winding connected in a loop circuit with the generator field winding, this said second named loop circuit having a resistance value so selected that it falls substantially on the straight portion of the no-load saturation curve of the regulating generator, said regulating generator having a forward pattern field winding, a reverse pattern field winding, a forward pattern self-saturating magnetic amplifier, a controller having a neutral position, a forward operating position, and a reverse operating position, said magnetic amplifier having suitably energized main windings connected to energize the forward pattern field winding of the regulating generator, having a bias winding biasing the magnetic amplifier to near cut-off, and having a control winding acting differentially to the bias winding, means responsive to the operation of the controller to the forward operating position for effecting the energization of the control winding whereby the main generator becomes excited, said reverse pattern field winding of said regulating generator being wound to act in opposition to the first or forward pattern field winding, a second or reverse pattern self-saturating magnetic amplifier having suitably energized main windings connected to energize the reverse pattern field winding of the regulating generator, said second magnetic amplifier having a bias winding for biasing the second magnetic amplifier near cut-off and having a control winding wound to act in opposition to the bias winding, a third self-saturating magnetic amplifier having suitably energized main windings connected to supply their output to the control winding of the second magnetic amplifier, said third magnetic amplifier having a bias winding for biasing the third magnetic amplifier to near cut-off, and having a control winding, acting in opposition to the bias winding, connected to be responsive to the motor load current, and having a second control winding also acting in opposition to the control windings, means responsive to the operation of the controller to the reverse operating position for effecting the energization of the second control winding, and damping transformer means responsive to changes in electrical operating characteristics of the first and third magnetic amplifiers and the main generator field winding for damping out excessive output voltage changes of the regulating generator.

15. In a system of control for a Ward-Leonard drive, in combination, a main generator having an armature winding and a field winding, the excitation of which is to be controlled, a motor having an armature winding connected in a loop circuit with the armature winding of the main generator and having a field winding, in use, connected to suitably energized terminals to thus be excited in any selected manner, a regulating generator having an armature winding connected in a loop circuit with the generator field winding, this said second named loop circuit having a resistance value so selected that it falls substantially on the straight portion of the no-load saturation curve of the regulating generator, said regulating generator, said regulating generator having a voltage-regulating field winding connected to the main generator to be responsive to the voltage of the main generator, a forward pattern field winding, a reverse pattern field winding, a forward pattern self-saturating magnetic amplifier, a controller having a neutral position, a forward operating position, and a reverse operating position, said magnetic amplifier having suitably energized main windings connected to energize the forward pattern field winding of the regulating generator, having a bias winding biasing the magnetic amplifier to near cut-off, and having a control winding acting differentially to the bias winding, means responsive to the operation of the controller to the forward operating position for effecting the energization of the control winding whereby the main generator becomes excited, said reverse pattern field winding of said regulating generator being wound to act in opposition to the first or forward pattern field winding, a second or reverse pattern self-saturating magnetic amplifier having suitably energized main windings connected to energize the reverse pattern field winding of the regulating generator, said second magnetic amplifier having a bias winding for biasing the second magnetic amplifier near cut-off and having a control winding wound to act in opposition to the bias winding, a third self-saturating magnetic amplifier having suitably energized main windings connected to supply their output to the control winding of the second magnetic amplifier, said third magnetic amplifier having a bias winding for biasing the third magnetic amplifier to near cut-off, and having a control winding, acting in opposition to the bias winding, connected to be responsive to the motor load current, and having a second control winding also acting in opposition to the control windings, means responsive to the operation of the controller to the reverse operating position for effecting the energization of the second control winding, and damping transformer means responsive to changes in electrical operating characteristics of the first and third magnetic amplifiers and the main generator field winding for damping out excessive output voltage changes of the regulating generator.

References Cited in the file of this patent

UNITED STATES PATENTS 2,627,597    Johansson _____ Feb. 3, 1953